United States Patent [19]

Kempken et al.

[11] Patent Number: 4,648,170

[45] Date of Patent: Mar. 10, 1987

[54] APPARATUS FOR CHANGING THE TOP JAWS OF A CHUCK

[75] Inventors: Rainer Kempken, Erkrath; Josef Steinberger; Johann Ritschel, both of Düsseldorf, all of Fed. Rep. of Germany

[73] Assignee: Paul Forkardt GmbH & Co. KG, Düsseldorf, Fed. Rep. of Germany

[21] Appl. No.: 735,384

[22] Filed: May 17, 1985

[30] Foreign Application Priority Data

May 18, 1984 [DE] Fed. Rep. of Germany ....... 3418553

[51] Int. Cl.⁴ ............................................ B23Q 3/156
[52] U.S. Cl. .................................................... 29/568
[58] Field of Search .............. 29/568, 26 A; 279/1 TS

[56] References Cited

U.S. PATENT DOCUMENTS 4,313,252 2/1982 Kuska et al. ........................... 29/568
4,532,692 8/1985 Miyachi ................................ 29/568

FOREIGN PATENT DOCUMENTS 2610587 9/1977 Fed. Rep. of Germany ........ 29/568
2624775 12/1977 Fed. Rep. of Germany ........ 29/568
2805828 8/1979 Fed. Rep. of Germany ........ 29/568
55-5273 1/1980 Japan ..................................... 29/568

Primary Examiner—William R. Briggs
Attorney, Agent, or Firm—Becker & Becker, Inc.

[57] ABSTRACT

An apparatus for rapidly changing the top jaws of a power-operated chuck having several jaws which are movably guided in a radial direction in a chuck body. Each chuck jaw is formed by a base jaw, and by a top jaw which is exchangeably mounted on the base jaw. After an arresting mechanism has been released, each top jaw can be removed from its base jaw by a relative movement with respect to the latter. The exchange of the top jaws is effected with the aid of a changing apparatus which can be converted from a rest position into a changing position in front of the chuck. The changing apparatus is provided with guide rails which are adapted to correspond with guide surfaces of the base jaws. At least one top jaw is supported on these guide rails, and can be exchanged for the top jaw presently on the base jaw by being displaced by a pusher, which is provided with engaging elements. In order to avoid expensive drive mechanisms within the changing apparatus, the pushers are driven by a movement which is introduced from the outside into the changing apparatus, with this movement being derived from a movement of a tool, a tool support, or some other driven component of the machine tool or of a workpiece grabbing device associated with this machine tool.

14 Claims, 11 Drawing Figures

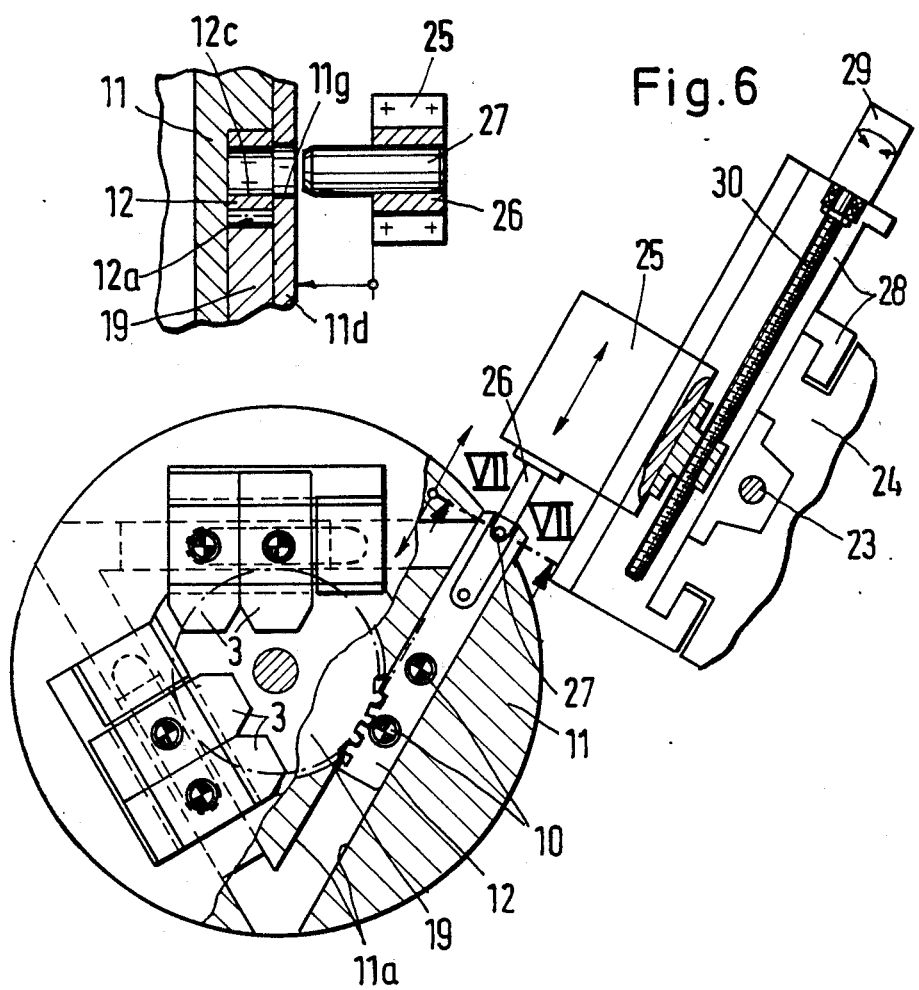

APPARATUS FOR CHANGING THE TOP JAWS OF A CHUCK

BACKGROUND OF THE INVENTION

1. Field of the Invention

The present invention relates to an apparatus for rapidly changing the top jaws of a power-operated chuck having several jaws which are movably guided in a radial direction in a chuck body; each chuck jaw is formed by a base jaw, and a top jaw which is exchangeably mounted on the base jaw; after an arresting mechanism has been released, each top jaw can be removed from its base jaw by a relative movement with respect to the latter; in a normal mounted state, the top jaws are positively fixed in position in the radial direction on their base jaws; the base jaws are provided with guide surfaces for corresponding cooperating surfaces of the top jaws; the changing apparatus can be converted from a rest position into a changing position in front of the chuck; the changing apparatus is provided with guide rails which are adapted to correspond with the guide surfaces of the base jaws, with the guide rails being spaced from one another by a distance corresponding at least to the width of the chuck jaws; the guide rails furthermore represent a continuation, to both sides, of the guide surfaces of the base jaw of that chuck jaw on which the guide rails are placed in the changing position of the changing apparatus; at least one top jaw is supported on the guide rails, and can be exchanged for the top jaw presently on the base jaw by being displaced by a pusher, which is provided with engaging elements.

2. Description of the Prior Art

An apparatus for rapidly changing the top jaws of a power-operated chuck having the aforementioned general features is known from German Patent 26 10 587. With this heretofore known construction, the changing apparatus is equipped with a built-in drive mechanism for the pushers, so that it is necessary to provide the changing apparatus, which is movable between a rest position and a changing position, with power lines and supply lines, such as pressure medium lines, which on the one hand restrict the mobility of the changing apparatus, and on the other hand must be disposed within the working space of the machine.

An object of the present invention is to improve an apparatus of the aforementioned general type in such a way that a drive mechanism built into the changing apparatus can be omitted, so that the rapid-change apparatus is independent of the power and pressure medium supply lines, and can be utilized with the aid of a known workpiece grabbing device in the machine.

BRIEF DESCRIPTION OF THE DRAWINGS

This object, and other objects and advantages of the present invention, will appear more clearly from the following specification in conjunction with the accompanying drawings, in which:

FIG. 6 is a partially sectioned end view of a fifth inventive embodiment of the changing apparatus;

FIG. 7 is a view showing a partial section taken along the line VII—VII in FIG. 6;

SUMMARY OF THE INVENTION

Figure 1:
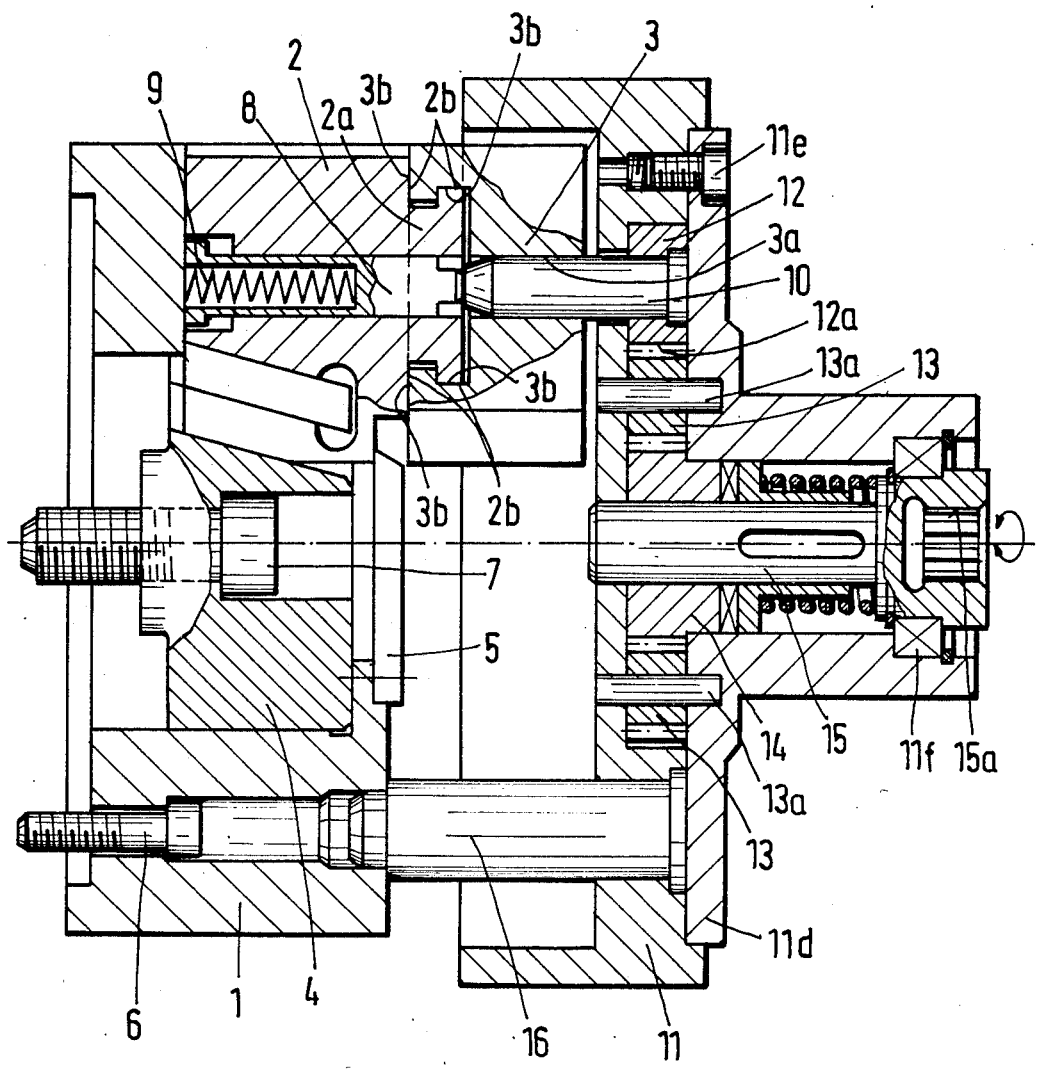
FIG. 1 is a longitudinal sectioned view taken through a first inventive embodiment of the changing apparatus, which is in the changing position.

The changing apparatus of the present invention is characterized primarily in that the pushers of the apparatus are driven by a movement which is introduced from the outside into the changing apparatus, and which is derived from a movement of a tool, tool support, or some other driven component of the machine tool or of a workpiece grabbing device associated with this machine tool.

Pursuant to the proposal of the present invention, it is possible to drive the changing apparatus, which is movable, for example, by a workpiece grabbing device between a changing position and a rest position, by means of the movement of a tool or tool support, or by means of a movement derived therefrom, so that not only is it possible to omit a separate drive mechanism which has to built into the changing apparatus, but it is now possible to utilize an existing drive, the movement of which is already a part of the machine. Thus, the present invention also eliminates the necessity of providing an additional drive mechanism for the machine, so that not only the construction of the rapid-change apparatus is simplified, but the control required on the machine for this apparatus also is simplified.

Pursuant to a further feature of the present invention, the movement of the pushers can be derived from a rotary drive of a tool, with such a drive mechanism being formed, for example, by a rotating screw tool which exists in the turrethead of a turning machine. Pursuant to an alternative embodiment of the present invention, the movement of the pushers can be derived from the movement of a tool support, with this movement being accommodated without difficulty in the plan of the machine tool.

If, pursuant to a further feature of the present invention, the pushers of the changing apparatus are interconnected by means of a common coupling member, they can be driven synchronously. Pursuant to a preferred embodiment, the changing apparatus is provided with a drive gear, which is driven by a rotary drive of a tool, and which drives the common coupling member.

Pursuant to an alternative embodiment of the present invention, the coupling member can be driven by a transmitting element via a rotary movement of a tool turret. In this case also, the movement derived from the rotary movement of the tool support can be accommodated in a simple manner in the plan of the machine tool.

It is furthermore proposed pursuant to the present invention to provide the coupling member with at least one set of teeth which meshes not only with the drive gear, or an intermediate gear driven thereby, but also with cooperating teeth formed on each of the pushers, so that there results a particularly simple construction for the synchronous drive of the pushers.

If the movement of the pushers is derived from a movement of a tool support, there exists the possibility of driving at least one of the pushers by a linear movement of a component which is present on the machine tool. In the simplest case, this component can be a hydraulic or other pressure medium cylinder which is disposed on the machine tool or on a workpiece gripping device associated therewith. The cylinder housing can be fixedly disposed on the machine tool, with a coupling between the piston rod of the pressure medium cylinder and the changing device being effected by a movement of the changing apparatus into the changing position. Alternatively, the housing of the pressure medium cylinder can be attached to a movable part of the machine tool, for example to a tool carriage. In this case, a coupling between the piston rod of the pressure medium cylinder and the changing apparatus can be effected by a movement of that component which supports the pressure medium cylinder.

It is finally proposed pursuant to the present invention to utilize an existing tool carriage as a component for carrying out a linear movement for driving the pushers. In the case of a synchronous movement of all of the pushers of the changing apparatus, this component meshes with an intermediate member which is connected in a suitable manner with the coupling member which is common to all of the pushers.

DESCRIPTION OF PREFERRED EMBODIMENTS

Referring now to the drawings in detail, all of the illustrated embodiments of the changing apparatus serve for the rapid changing of the top jaws of a power-operated chuck, one possible embodiment of which is illustrated in FIG. 1. This chuck has a chuck body 1, in which three chuck or clamping jaws are guided in such a way that they are radially movable. Each chuck jaw comprises a base jaw 2 and a top jaw 3. The chuck jaws are operated in common by a chuck piston 4, which is mounted in the chuck body 1 in such a way that it is movable in the axial direction, and which, by its movement, effects a radial displacement of the chuck jaws. At the end, the chuck body 1 is closed off in the region of the chuck piston 4 by a cover 5. The chuck body 1 is mounted by means of screws 6 onto a spindle of a non-illustrated machine tool. By means of a draw-in bolt 7, the chuck piston 4 is connected with the piston rod of a power operation, for example a hydraulic piston.

Provided on one end face of the base jaws 2 is a T-shaped projection 2a having guide surfaces 2b which extend tangential to the axis of rotation of the chuck. Each top jaw 3 is provided with a recess which corresponds to the T-shaped projection 2a of the base jaws 2; this recess has guide surfaces 3b which serve not only for determining the axial position of the top jaws 3 on the base jaws 2, but also effect a determination of the radial position, with this applying both in the centrifugal as well as the centripetal directions.

In the region of the recess which is provided for the T-shaped projection 2a, each top jaw 3 has a bore 3a in which can engage the head of a safety bolt 8 which is disposed in each base jaw 2 parallel to the axis of rotation of the chuck. This safety bolt 8 is under the force of a spring 9. As can be seen from FIG. 1, the radially outer periphery and the radially inner periphery of the head of the safety bolt 8 are flattened in order at these locations not to form any contact or abutment surfaces, which would make it difficult to obtain a good positioning of the top jaw 3 on the base jaw 2.

Each of the safety bolts 8 can be pushed back into the base jaw 2 by a push rod 10, counter to the force of the spring 9, when this push rod 10 is introduced into the bore 3a of the top jaw 3 in the axial direction. After the safety bolt 8 has been pressed back, each top jaw 3 can be shifted along the guide surfaces 2b and 3b in the tangential direction relative to the axis of rotation of the chuck, and can thus be separated from the base jaw 2 or can be placed thereupon.

Such changing of the top jaws 3 is effected with the aid of a changing apparatus, the basic design of which will be described in connection with the first embodiment shown in FIGS. 1 and 2.

This changing apparatus includes a cylindrical support member 11 which is provided with tangentially extending guide grooves 11a for pushers 12, the number of which correspond to the number of chuck jaws. In the illustrated embodiment, the changing apparatus, which is designed for a three-jaw chuck, has three of these pushers 12. Each of the pushers 12 is provided with at least two of the aforementioned push rods 10, on each of which is placed a top jaw 3. These top jaws 3 are located within a recess 11b, into which extend, from the side, guide rails 11c, the cross-section of which corresponds to the T-shaped projection 2a of the base jaws 2, and upon which are supported the top jaws 3, which are located to the side of these base jaws 2. The guide surfaces of these T-shaped guide rails 11c, which are spaced from one another at a distance corresponding at least to the width of the top jaws 3, represent a continuation of the guide surfaces 2b of the base jaws 2 on both sides.

Figure 2:
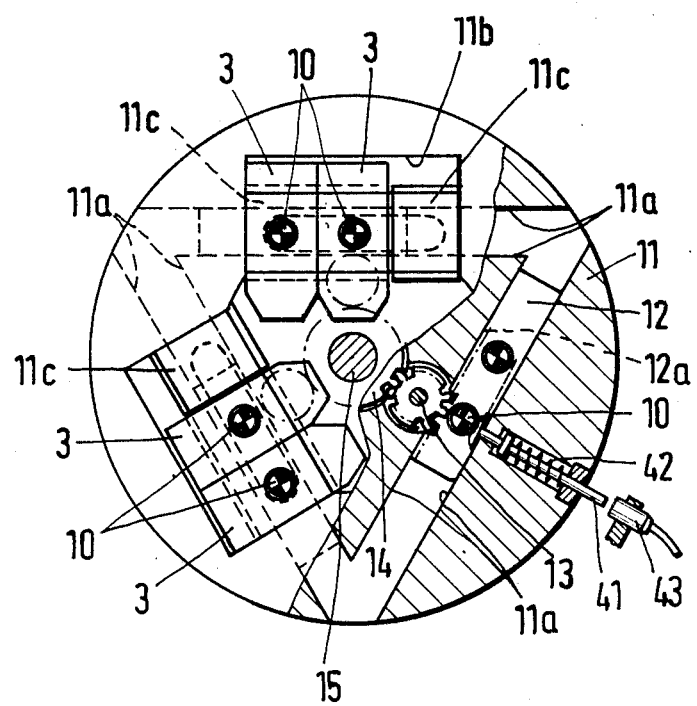
FIG. 2 is a partially sectioned end view of the changing apparatus of FIG. 1.

In the embodiment of FIGS. 1 and 2, there is effected a synchronous displacement of the pusher 12 into the guide grooves 11a of the cylindrical support member 11 of the changing apparatus. For this purpose, the underside of the pushers 12, facing the axis of rotation, is provided with teeth 12a. The teeth of an associated intermediate gear wheel 13 mesh with these teeth 12a of each pusher 12; the gear wheel 13 is rotatably mounted on a support pin 13a in the support member 11. The drive of all of the intermediate gear wheels 13 is effected by a central drive gear 14, which is disposed on a drive shaft 15. The drive gear 14 can be connected with the drive shaft 15 by means of a spring-loaded coupling member. The drive shaft 15 is operated by a rotary drive of a tool, for example by a screw tool located in the turrethead of the machine tool. For this purpose, the drive shaft 15 is provided with a multisided drive element 15a into which an appropriate part of a screw tool can be introduced.

FIG. 1 shows that the cylindrical support member 11 is provided with a support cover 11d, which is screwed to the support member 11 by means of screws 11e, and contains the bearing 11f for the drive shaft 15. In order to achieve an exact alignment of the support member 11 relative to the chuck body 1, in the embodiment illustrated in FIG. 1 centering bolts 16 are provided in the support member 11. Bevelled centering sections of the centering bolts 16 extend into the bores provided for the chuck-mounting screws 6, in this manner effecting the exact alignment of the support member 11 relative to the chuck body 1, and at the same time absorbing the torque during driving of the pushers 12.

When the changing apparatus illustrated in FIGS. 1 and 2 is placed onto the chuck body 1 of the chuck in the axial direction, for example by means of a gripping device associated with the machine tool, the push rods 10 enter the bores 3a of the top jaws 3. As soon as the changing apparatus has reached the changing position, which is defined, for example, by means of an abutment surface on the centering bolts 16, the push rods 10 have pressed the safety bolts 8 back into the base jaws 2 counter to the force of the springs 9 such that the safety bolts 8 no longer engage the top jaws 3. Thus, the top jaws 3 on the base jaws 2 can now, by shifting the pusher 12, be exchanged for top jaws 3 located on the other push rod 10 of the pushers 12.

The pushers 12 are driven by a rotatably driven tool present on the machine tool; this tool is introduced into the multi-sided drive element 15a of the drive shaft 15. A rotary movement of this tool accordingly effects a rotation of the drive gear 14, the rotary movement of which is synchronously transmitted to the pushers 12 via the intermediate gear wheels 13 and the teeth 12a.

As soon as the pushers 12 have been displaced approximately a distance corresponding to the width of the top jaws 3, and have hereby placed the new top jaws 3 onto the base jaws 2, the support member 11 of the changing apparatus is withdrawn from the chuck body 1 in the axial direction. In so doing, the safety bolts 8 enter the bores 3a of the newly positioned top jaws 3, so that the latter are held securely in place on the base jaws 2 for the subsequent chucking or clamping task.

Figure 3:
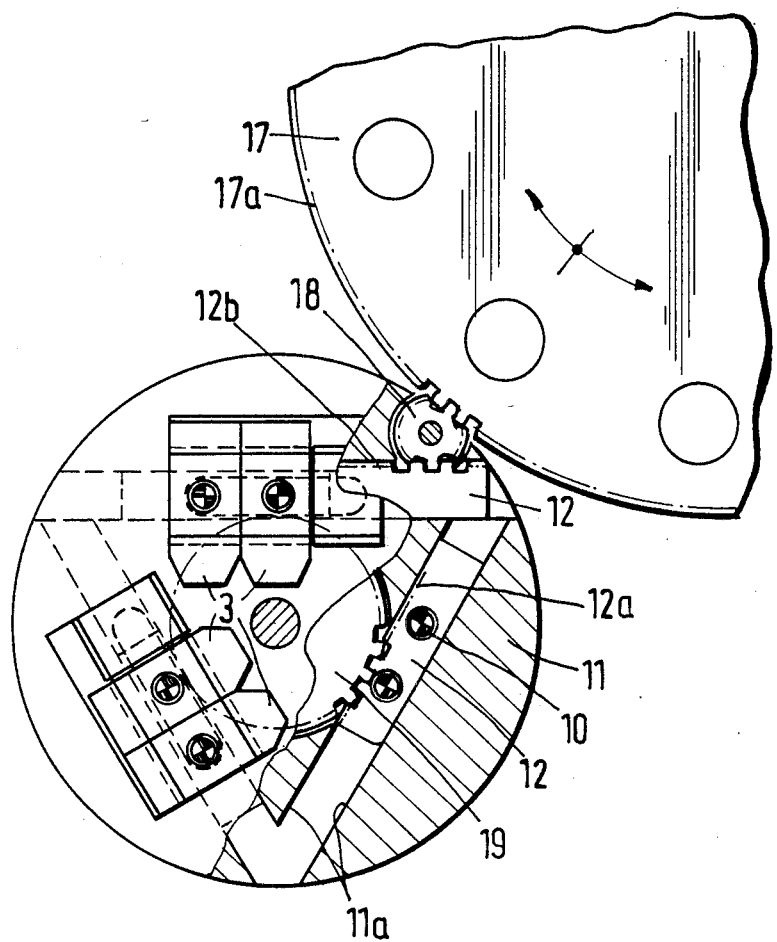
FIG. 3 is a partially sectioned end view of a second inventive embodiment of the changing apparatus.

In the second embodiment of FIG. 3, the rotary movement of a tool support is used for the drive of the pushers 12. For this purpose, the turret 17 is provided with peripheral teeth 17a. As soon as the changing apparatus, the essential parts of which correspond to those of the previously described embodiment, is placed on the chuck, the turret 17 is moved onto the changing apparatus, which is in the changing position. The peripheral teeth 17a of the turret 17 then engage the teeth of a driving pinion 18, which is rotatably mounted in the support member 11 of the changing apparatus, and in turn engages drive teeth 12b of a pusher 12. A rotary movement of the turret 17, through the interposition of the driving pinion 18, thus results in displacement of one pusher 12. The two other pushers 12 are synchronously displaced with the directly driven pusher 12 because a common coupling member meshes with the teeth 12a of all of the pushers 12; in the embodiment of FIG. 3, this common coupling member is formed by a central gear wheel 19.

Figure 4:
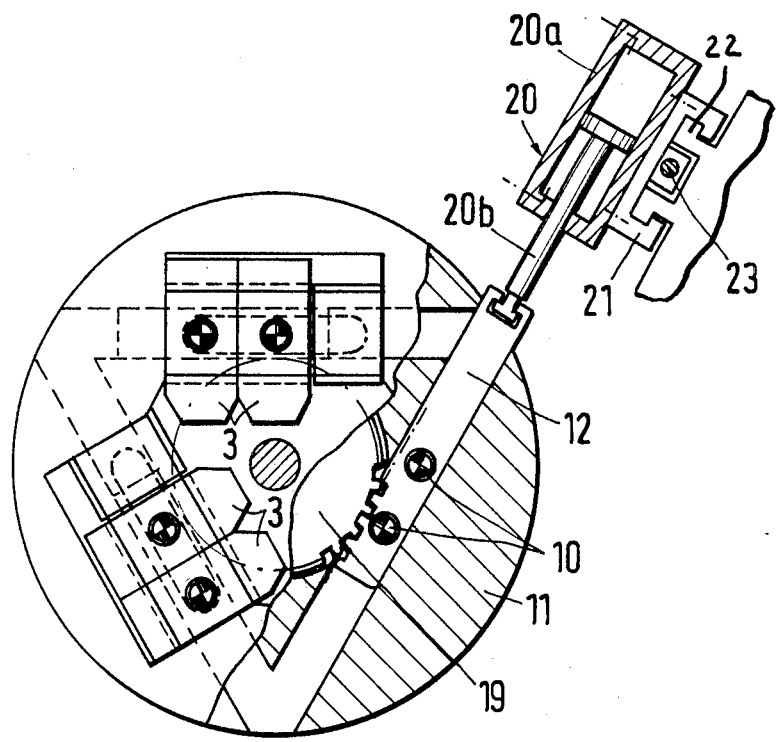
FIG. 4 is a partially sectioned end view of a third inventive embodiment of the changing apparatus.

Also in the third embodiment of FIG. 4, the synchronous drive of the pushers 12 is effected with the aid of a coupling gear wheel 19, and by driving only one pusher 12 with the aid of a component, which is present on the machine tool, and which executes a linearly movement. As shown in FIG. 4, this component is formed by a hydraulic or pressure medium cylinder 20, the cylinder housing 20a of which is mounted on a carriage 21 of the machine tool. This carriage 21 can either be an existing tool carriage, or can be a separate carriage which can be moved parallel to the axis of rotation of the chuck on a guide 22 of the machine tool with the aid of a spindle 23. The piston rod 20b extended from the cylinder housing 20a is provided with a coupling part which extends into an appropriate recess of one of the pushers 12, as illustrated in FIG. 4.

As soon as the changing apparatus is in the changing position, the cylinder 20 is moved with the aid of the carriage 21 in such a way that the coupling parts of the piston rod 20b and of the pusher 12 interengage. By actuating the cylinder 20, there is subsequently effected a linear movement of the piston rod 20b, and hence of the directly driven pusher 12. By means of this movement, which is introduced from the outside into the changing apparatus, the previously described changing of the top jaws 3 is undertaken. As soon as this rapid changing has been carried out, the piston rod 20b, with the aid of the carriage 21, is moved out of engagement with the pusher 12. The changing apparatus is thereupon moved into the rest position.

Figure 5:
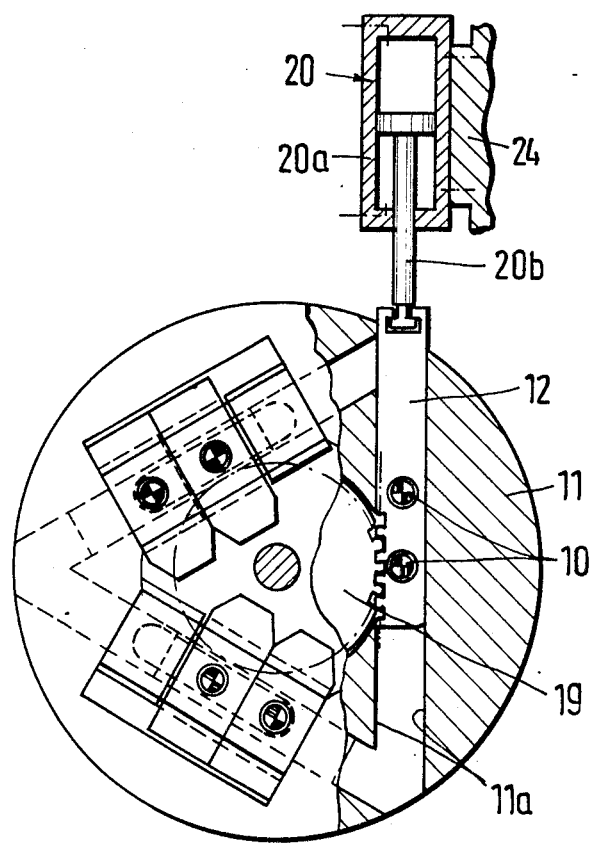
FIG. 5 is a partially sectioned end view of a fourth inventive embodiment of the changing apparatus.

The fourth embodiment illustrated in FIG. 5 corresponds essentially to the embodiment of FIG. 4. The difference is that the pressure medium cylinder 20 in this embodiment is fixedly mounted to the bed 24 or other fixed part of the machine tool. The coupling between the piston rod 20b and the directly driven pusher 12 is effected with an axial conversion of the changing apparatus in its changing position; for this purpose, it is necessary on the one hand to convert the chuck, and hence the changing apparatus, when in a stopped condition, into a specific position, and on the other hand to extend the piston rod 20b, for example by means of a limit switch, into a specific position, so that when axially placing the changing apparatus onto the chuck, there is effected a coupling between a pusher 12 and the piston rod 20b.

In the fifth embodiment of FIGS. 6 and 7, the pushers 12 are also coupled with one another by a coupling gear wheel 19. The drive of these pushers is effected in this embodiment by the linear movement of a cross slide 25, which is provided with a coupling push rod 26. This push rod 26 supports a coupling pin 27 which projects to the side and can be introduced into a coupling bore 12c in one of the pushers 12 (FIG. 7).

As shown in FIG. 6, the cross slide 25 with the coupling push rod 26 can be moved transverse to the axis of rotation of the chuck on the carriage 28. This transverse movement is effected in the illustrated embodiment by a stepping motor 29 with the aid of a shaft 30. A spindle 23 serves for the linear movement of the carriage 28 on the bed 24 of the machine tool.

As soon as the changing apparatus is in the changing position in front of the chuck, the cross slide 25, with the aid of the carriage 28, is moved into a position in which the coupling pin 27, as shown in FIG. 7, can be conveyed in front of the coupling bore 12c of the pusher 12. The alignment of the coupling pin 27 is effected with the aid of the stepping motor 29. Subsequently, with the aid of the spindle 23, the carriage 28 is moved parallel to the axis of rotation of the chuck, so that the coupling pin 27 enters the coupling bore 12c of the pusher 12. A linear movement of the cross slide 25 is subsequently generated by the stepping motor 29 via the shaft 30. The result is a synchronous movement of all three of the pushers 12 in order to carry out the previously described changing of the top jaws 3. The support cover 11d of the support member 11 (see FIG. 7) is provided with a slot 11g in order to permit the linear movement of the coupling pin 27.

Figure 8:
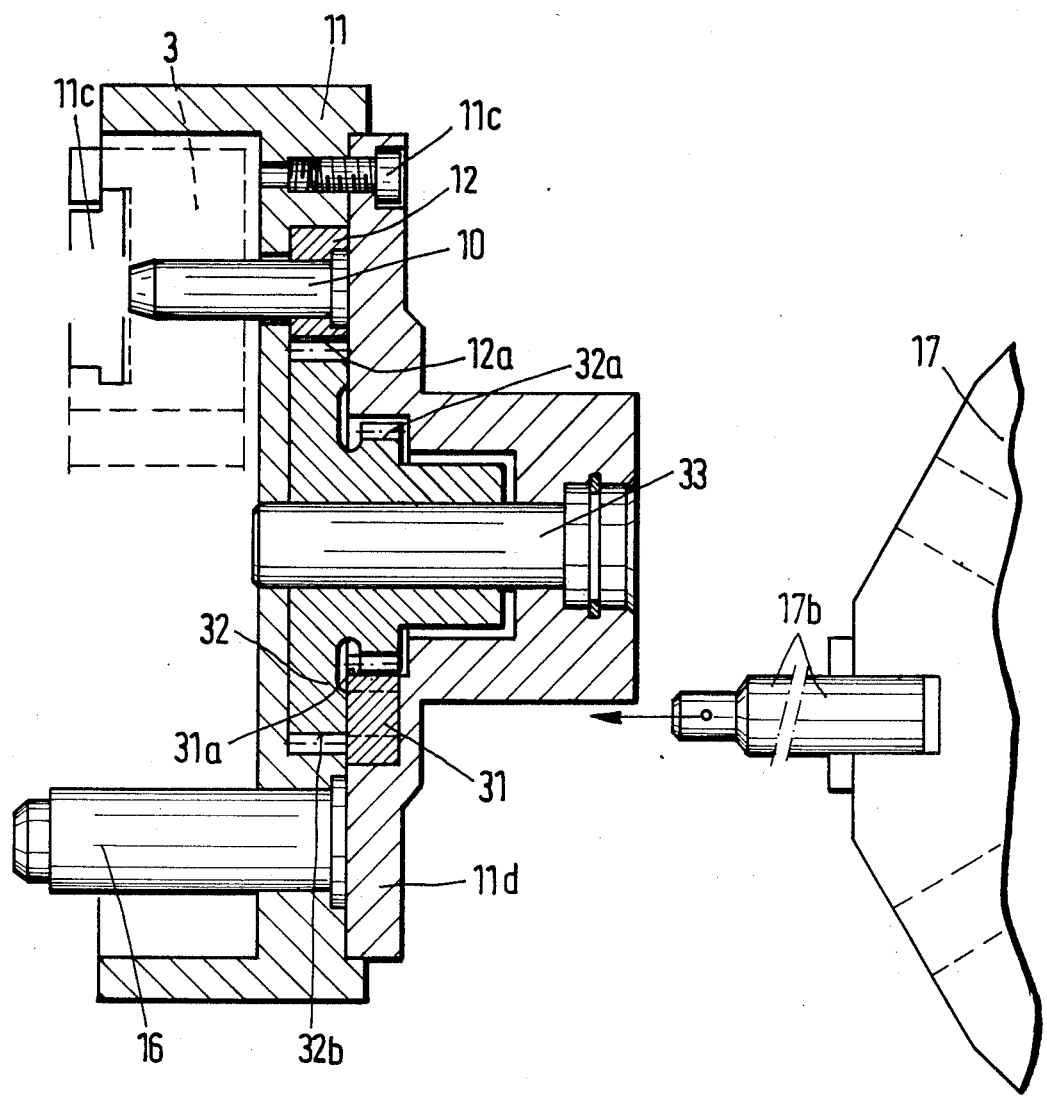
FIG. 8 is a view showing a longitudinal section through a sixth inventive embodiment of the changing apparatus.
Figure 9:
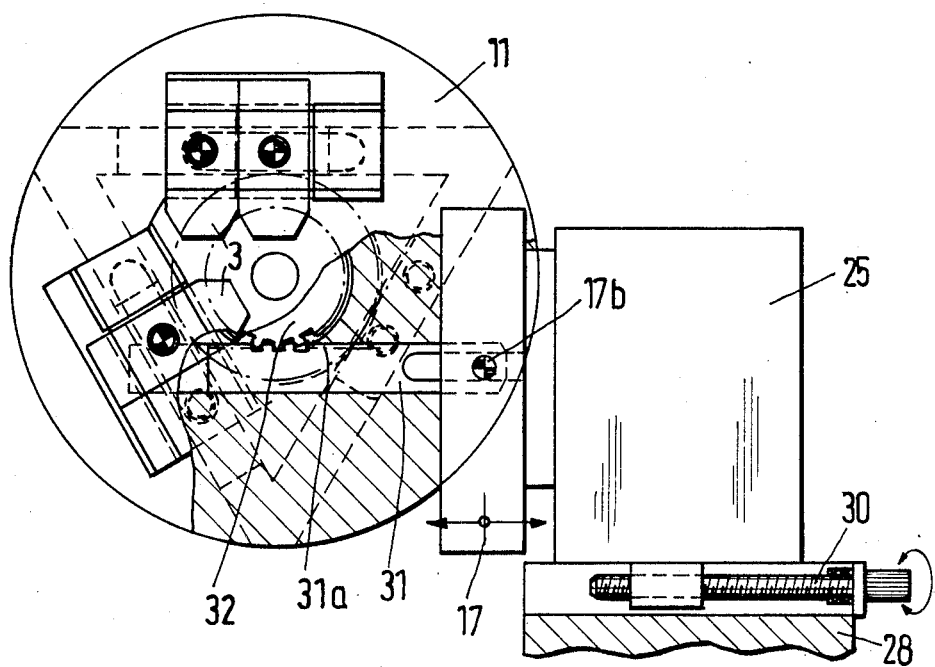
FIG. 9 is a partially sectioned end view of the changing apparatus of FIG. 8.

The sixth embodiment of FIGS. 8 and 9 again shows a changing apparatus, the pushers of which are driven by the linear movement of a tool support. As shown in FIG. 8, a turret 17 which supports a tool and which is provided with a coupling pin 17b is again used as a tool support. The coupling pin 17b extends from the peripheral surface of the turret 17, as can be seen particularly clearly in FIG. 8. The turret 17 is rotatably mounted in a known manner on a cross slide 25 of the machine tool. With the aid of the shaft 30, the cross slide 25 can be moved on a carriage 28 at right angles to the axis of rotation of the chuck, as shown by the double-headed arrow in FIG. 9.

After aligning the carriage 28 relative to the changing apparatus, which is in the changing position, there is effected a transverse shifting of the turret 17 with the aid of the shaft 30, so that the coupling pin 17b catches in an appropriate recess of a drive pusher 31 which, like the pushers 12, can be moved in tangential guides of the support member 11. This drive pusher 31 is provided with a toothed rack 31a with which it meshes with the drive teeth 32a of a double toothed coupling gear 32, which is freely rotatably mounted on a shaft 33 in the support cover 11d of the support member 11. By means of output teeth 32b, this coupling gear 32, which serves as the coupling member, meshes with the teeth 12a of the pushers 12, so that a linear movement of the drive pusher 31 results in a corresponding linear movement of all of the pushers 12. In this connection, the respective amount of motion is converted by the differences between the drive teeth 32a and the output teeth 32b. Thus with this embodiment also the movement of the pushers is produced by a linear movement which is introduced into the changing apparatus from the outside and is derived from a movement of a tool support.

Figure 10:
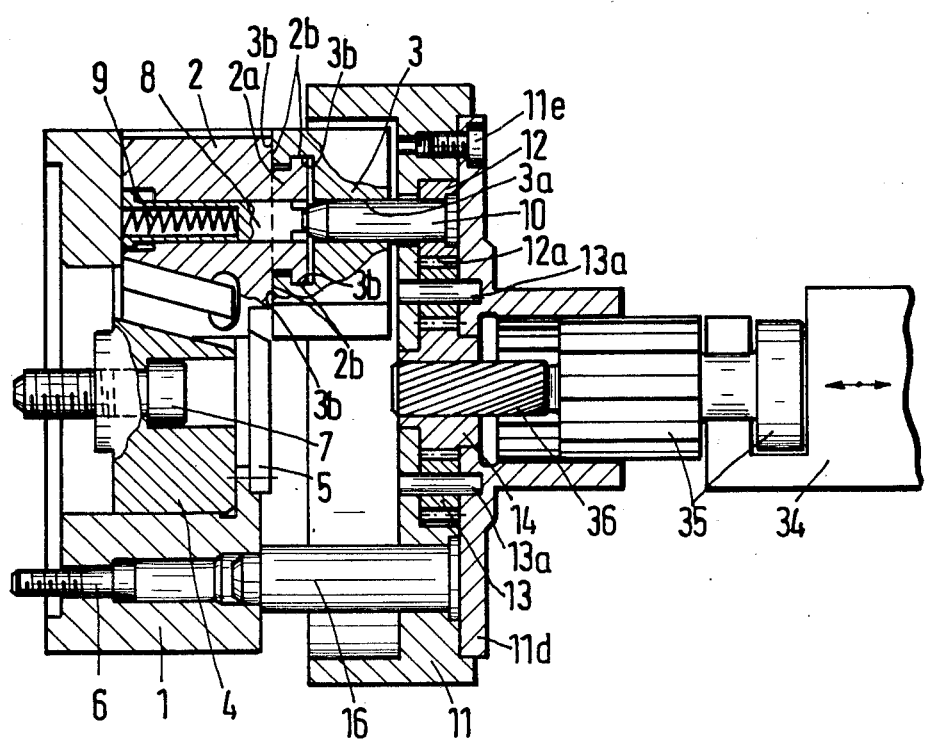
FIG. 10 is a view that shows an alternative possibility for driving the embodiment of FIG. 1.

The basic design of the further embodiment of FIG. 10 corresponds to that of the embodiment of FIG. 1. However, whereas in the latter a rotary drive is introduced directly into the rotatably mounted drive gear 14, in the embodiment of FIG. 10 the central drive gear 14 is driven by a linear movement of a component 34. For this purpose, the component 34 engages an intermediate member 35 which is guided in the support cover 11d in such a way that it can be moved in the direction of the axis of rotation of the chuck; the intermediate member 35 is also provided with a coarse thread 36 which meshes with a corresponding thread in the central recess of the drive gear 14. Thus, in this embodiment the back and forth linear movement of the component 34 results in a rotational movement of the drive gear 14. The linear drive movement can, for example, be produced by a component located in the tailstock quill. As an alternative, it is also possible to produce the movements by a workpiece gripping device associated with the machine tool.

Figure 11:
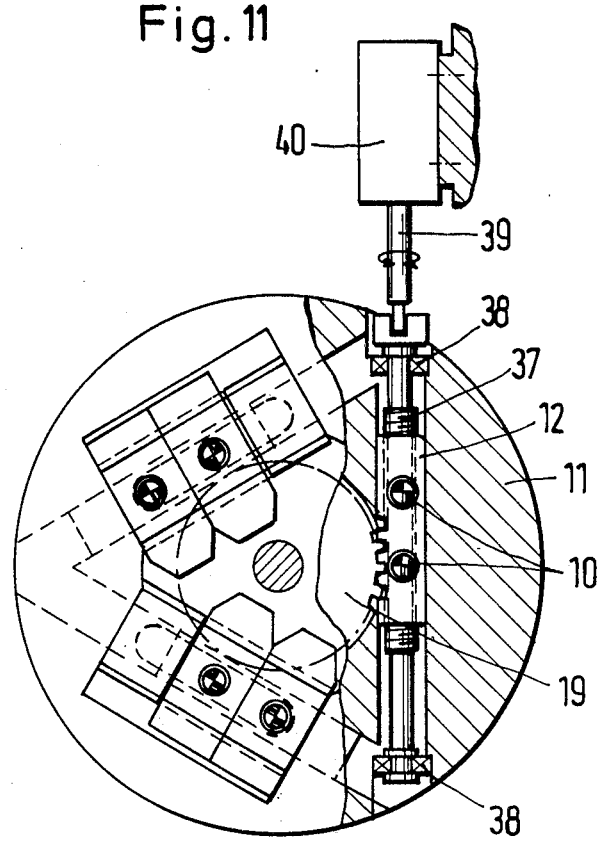
FIG. 11 is a view that shows a modification of the drive for the embodiment of FIG. 2.

FIG. 11 illustrates an alternative drive possibility for a embodiment such as that already described in connection with FIG. 2. In the embodiment of FIG. 11, a drive shaft 37 is disposed in one of the pushers 12; this shaft 37 is held securely in position by the support 38 in the support member 11 so that it cannot move in the axial direction. An outer thread of the drive shaft 37 meshes with a corresponding internal thread of the pusher 12, so that a rotational movement of the axially fixed drive shaft 37 results in an axial displacement of the pusher 12. By means of the coupling gear wheel 19, the two other pushers 12 are then driven in the manner already described in connection with the embodiment of FIG. 2.

Drive of the drive shaft 37 is effected in the embodiment of FIG. 11 by the rotary movement of a shaft 39, which engages by means of an appropriate coupling element in a cooperating part of the drive shaft 37. With regard to the shaft 39, the coupling element can, for example, be a part of a motor drive 40, such as exists on machine tools, for example for milling tools.

In order to monitor the position of the pushers 12 at any given time, a monitoring device can be provided as shown in FIG. 2. In this embodiment, the monitoring device comprises a sensing pin 41 which is movably mounted in the support member 11 at right angles to the direction of movement of the pusher 12; the radially inwardly disposed end of the sensing pin 41 extends into a wedge-shaped recess of the pusher 12. In order to assure that the sensing pin 41 extends into this recess, the pin 41 is stressed by a spring 42. The position of the sensing pin 41 is detected by a sensor 43 which is disposed on a stationary part of the machine tool. This sensor 43 makes it possible to determine whether the pusher 12 is in the position illustrated in FIG. 2, in which the sensing pin 41 has its maximum extension out of the support member 11, or whether the pusher 12 is in the other end position, in which the sensing pin 41 is retracted further into the support member 11 by means of the spring 42. With the aid of this device, it is possible to monitor the position of the pushers 12, so that it is possible to know which jaws are located on the chuck and which are located in the changing apparatus.

The present invention is, of course, in no way restricted to the specific disclosure of the specification and drawings, but also encompasses any modifications within the scope of the appended claims.

What we claim is:

1. An apparatus for rapidly changing the top jaws of a power-operated chuck having several jaws which are movably guided in a radial direction in a chuck body; each chuck jaw being formed by a base jaw, and by a top jaw which is exchangeably mounted on said base jaw; after an arresting mechanism has been released, a given top jaw can be removed from its base jaw by a relative movement with respect to the latter; in a normal mounted state, said top jaws being positively fixed in position in the radial direction on their base jaws; said base jaws being provided with guide surfaces for corresponding cooperating surfaces of said top jaws; said changing apparatus can be converted from a rest position into a changing position in front of said chuck; said changing apparatus being provided with guide rails which are adapted to correspond with said guide surfaces of said base jaws, with said guide rails being spaced from one another by a distance corresponding at least to the width of said chuck jaws; said guide rails furthermore representing a continuation, to both sides, of said guide surfaces of said base jaw of that chuck jaw on which said guide rails are placed in the changing position of said changing apparatus; at least one top jaw being supported on said guide rails, and can be exchanged for the top jaw presently on the base jaw by being displaced by a pusher, which is provided with engaging elements; the improvement therewith which comprises:

means for driving said pushers wherein movement is imparted to said means from other than said apparatus; said movement for said means for driving said pushers being derived from a rotary drive mechanism of a tool; derived from a movement of a tool support; derived from another driven structural part of a machine tool, respectively worked-article grabbing device provided therewith; and a common coupling member for interconnecting said pushers.

2. A changing apparatus according to claim 1, in which said movement for said means for driving said pushers is derived from a rotary drive mechanism of a tool.

3. A changing apparatus according to claim 1, in which said movement for said means for driving said pushers is derived from a movement of a tool support.

4. An apparatus for rapidly changing the top jaws of a power-operated chuck having several jaws which are movably guided in a radial direction in a chuck body; each chuck jaw is formed by a base jaw, and by a top jaw which is exchangeably mounted on said base jaw; after an arresting mechanism has been released, a given top jaw can be removed from its base jaw by a relative movement with respect to the latter; in a normal mounted state, said top jaws are positively fixed in position in the radial direction on their base jaws; said base jaws are provided with guide surfaces for corresponding cooperating surfaces of said top jaws; said changing apparatus can be converted from a rest position into a changing position in front of said chuck; said changing apparatus is provided with guide rails which are adapted to correspond with said guide surfaces of said base jaws, with said guide rails being spaced from one another by a distance corresponding at least to the width of said chuck jaws; said guide rails furthermore represent a continuation, to both sides, of said guide surfaces of said base jaw of that chuck jaw on which said guide rails are placed in the changing position of said changing apparatus; at least one top jaw is supported on said guide rails, and can be exchanged for the top jaw presently on the base jaw by being displaced by a pusher, which is provided with engaging elements; the improvement therewith which comprises:

means for driving said pushers wherein movement is imparted to said means from other than said apparatus; and a common coupling member for interconnecting said pushers.

5. A changing apparatus according to claim 4, which includes a drive gear which is driven by a rotary drive mechanism of a tool, with said drive gear in turn driving said coupling member.

6. A changing apparatus according to claim 4, which includes a transfer element for directly driving said coupling member, with said transfer element being driven by a rotary movement of a tool turret.

7. A changing apparatus according to claim 4, which includes a member driven from outside said apparatus; in which each of said pushers is provided with first teeth; and in which said coupling member is provided with at least one set of second teeth which mesh not only with said driven member but also with said first teeth of said pushers.

8. A changing apparatus according to claim 3, in which at least one of said pushers is driven by a linear movement of a component of a machine tool on which said chuck is mounted.

9. A changing apparatus according to claim 8, in which said component is a pressure medium cylinder disposed on said machine tool.

10. A changing apparatus according to claim 8, in which said component is a carriage of said machine tool.

11. An apparatus for rapidly changing the top jaws of a power-operated chuck having several jaws which are movably guided in a radial direction in a chuck body; each chuck jaw is formed by a base jaw, and by a top jaw which is exchangeably mounted on said base jaw; after an arresting mechanism has been released, a given top jaw can be removed from its base jaw by a relative movement with respect to the latter; in a normal mounted state, said top jaws are positively fixed in position in the radial direction on their base jaws; said base jaws are provided with guide surfaces for corresponding cooperating surfaces of said top jaws; said changing apparatus can be converted from a rest position into a changing position in front of said chuck; said changing apparatus is provided with guide rails which are adapted to correspond with said guide surfaces of said base jaws, with said guide rails being spaced from one another by a distance corresponding at least to the width of said chuck jaws; said guide rails furthermore represent a continuation, to both sides, of said guide surfaces of said base jaw of that chuck jaw on which said guide rails are placed in the changing position of said changing apparatus; at least one top jaw is supported on said guide rails, and can be exchanged for the top jaw presently on the base jaw by being displaced by a pusher, which is provided with engaging elements; the improvement therewith which comprises:

means for driving said pushers wherein movement is imparted to said means from other than said apparatus; said movement for said means for driving said pushers being derived from a movement of a tool support; at least one of said pushers being driven by a linear movement of a component of a machine tool on which said chuck is mounted; said component being a carriage of said machine tool; and a member driven by said carriage, with said driven member meshing with a common coupling member which interconnects said pushers.

12. A changing apparatus according to claim 4, which includes means for monitoring the position of said pushers.

13. A changing apparatus according to claim 4, which includes a transfer element for indirectly driving said coupling member, with said transfer element being driven by a rotary movement of a tool turret.

14. A changing apparatus according to claim 8, in which said component is a pressure medium cylinder disposed on a workpiece grabbing device thereof.

* * * * *